March 17, 1970     C. C. OLDENBURG     3,501,493
PURIFICATION OF LOWER N-POLYHALOALKYLTHIOLIMIDES OF
1,2-DICARBOXYLIC-$C_6$-CARBOCYCLES
Filed April 27, 1967
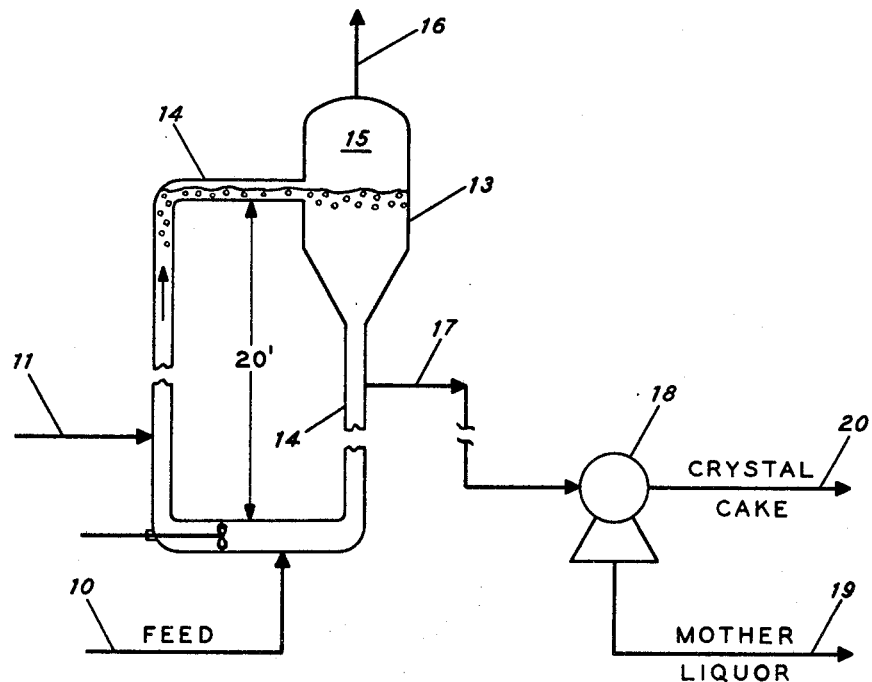
INVENTOR
CHARLES C. OLDENBURG

United States Patent Office 3,501,493
Patented Mar. 17, 1970

3,501,493
PURIFICATION OF LOWER N-POLYHALOALKYL-THIOLIMIDES OF 1,2-DICARBOXYLIC-C₆-CARBOCYCLES
Charles C. Oldenburg, Mill Valley, Calif., assignor to Chevron Research Company, San Francisco, Calif., a corporation of Delaware
Filed Apr. 27, 1967, Ser. No. 634,329
Int. Cl. C07d 27/52
U.S. Cl. 260—326   9 Claims

ABSTRACT OF THE DISCLOSURE

Continuous crystallization process for the purification of certain N-substituted imides of 1,2-dicarboxylic-$C_{4-6}$-carbocyclic compounds employing a circulating slurry, direct refrigeration and controlled supercooling.

---

The N-polyhaloalkylthiolimides of 1,2-dicarboxylic-$C_{4-6}$-carbocyclic compounds are useful in the field of fungicide control. In general, undesirable by-products, etc. are present in the crude product mixtures obtained in the manufacture of these compounds. These fungicides are relatively sensitive to heat and to the action of many ordinary chemical agents. These circumstances leave recrystallization as the practical means of choice for purification. A number of problems arise in the crystallization of the subject imides. Solubilities are in general low, and crystal sizes are small. Consequently, adsorption of impurities upon the solid is substantial under ordinary process conditions. In general the solubility temperature coefficients of the subject imides for most ordinary solvents are low. Hence, adequate control of process variables in general and cooling rates in particular is a must in order to achieve satisfactory crystal sizing improvement and enhanced product purity.

In the prior art, purification by batch crystallization is well known and is relatively unsatisfactory.

In the present process, imides of the formula

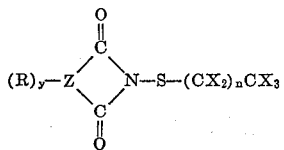

in which Z is a $C_{4-6}$, inclusive, carbocyclic ring, $n$ is in the range 0 to 3, inclusive, $y$ is in the range 0 to 2, inclusive, R is a lower alkyl ($C_{1-4}$, inclusive) and the X's are the same or different, being hydrogen or halogen having an atomic number less than 54. The carboxyl groups are in the 1,2-orientation relative to the carbocyclic ring. In the process a slurry of the imide in a suitable inert solvent, e.g., toluene, is charged to a crystallizer adapted to provide an elongated cyclical flow path. By a suitable means, for example, an axial flow pump, the slurry is circulated in the crystallizer. At a lower first portion of the crystallizer, a solution of the imide in the solvent is introduced into the circulating slurry. At the first or a second portion of the crystallizer an inert fluid refrigerant is introduced into the slurry and thereafter removed by vaporization from the slurry at an upper and third portion of the crystallizer. At a fourth portion of the crystallizer and at a point in the cycle subsequent to the vaporization, a fraction of the circulating slurry is withdrawn from the crystallizer for separation of the resulting imide crystals. The temperature of the slurry is maintained in the range substantially below the incipient crystal forming temperature of the solution and above about the 0.1 weight percent solubility temperature of the imide by control of the rate of addition of the refrigerant. Satisfactory results are obtained provided that supercooling does not exceed about 5° F.

In the attached figure is a schematic flow diagram of a preferred embodiment of the instant invention. The circulation loop, pipe 14, has a 2-foot diameter; vessel 13 has a 7-foot diameter and measures about 14 feet from cone bottom to top.

The process is continuous. At start-up sufficient of a solution of N-(1,1,2,2-tetrachloroethylthio)-Δ-4-tetrahydrophthalimide (about 10 weight percent) in toluene to substantially fill the circulation loop is charged to the crystallizer loop and associated outgas vessel 15. Circulation in the loop is commenced, and liquid carbon dioxide refrigerant (~0° F. and 300 p.s.i.g.) is introduced into the circulating solution via line 11 until the temperature of the resulting slurry approximates 70° F.

Via line 10 fresh feed, a substantially saturated solution of the imide in toluene, for example, about a 10 weight percent solution at 170° F., is introduced into the circulating slurry at a rate of about 20,000 lbs. per hour (46 gallons per minute). Concurrently, liquid carbon dioxide (0° F. and 300 p.s.i.g.) is introduced via line 11 at a rate of about 3400 lbs. per hour. The circulation rate in line 14 is about 200 gallons per minute. In vessel 13, via void space 15, carbon dioxide is vaporized and withdrawn from the solution, thereby withdrawing latent heat of crystallization and maintaining the slurry temperature at about 70° F. Via line 16 the carbon dioxide gas is passed to a recovery section, not shown, for recycle to the process. In zone 15 a pressure of about 5 p.s.i.g. is maintained. Via line 17 an amount of slurry sufficient to maintain an input-output balance in the crystallizer vessel is withdrawn and passed to a suitable recovery means, for example, a centrifuge 18, for separation and discharge of mother liquor, via line 19 and recovery of crystal cake, about 1800 lbs. per hour of dry solid, via line 20. The mother liquor contains about 0.1–0.6 weight percent of imide and associated impurities. The product cake average crystal size is in general 4 to 10 times larger than that for crystals obtained via conventional batch crystallization processing.

By elonged cyclical fluid flow is meant flow in which the fluid travel is directed, as opposed to random, and returns repetitively to an origin as in a pipe loop and the like.

By an inert fluid refrigerant is meant by definition fluids which are essentially chemically inert towards the subject imides in general and in particular under the instant process conditions and which have a substantial vapor pressure (at least about .3 atmosphere) at a temperature in the range above about 30° F. and below the decomposition temperature of the subject imides, i.e., be capable of a refrigeration cycle.

Representative useful fluid refrigerants include carbon dioxide, lower ethers, methane, ethane, ethene, propane, propene, butane, pentane (lower hydrocarbons) and mixtures thereof. Other examples include polyhalocarbons, such as Freon-type, carbon tetrachloride, chloroform, methylene chloride, etc. Carbon dioxide is preferred for reasons of cost and safety. Preferred refrigerants are those which are soluble in the solvent.

The amount of refrigerant desirably added to the circulating slurry varies depending upon several factors including feed temperature, convection effects, the amount of imide to be crystallized etc. These are, of course, conventional heat balance type considerations. In addition, and this is a prime requirement, the amount of added refrigerant is limited by the requirement that for satisfactory operation the supercooling of the circulating slurry cannot exceed about 5° F., preferably in the range from 0.1 to 2° F.

By supercooling in terms of a temperature differential as used herein is meant the temperature difference between the actual temperature of any given supersaturated imide solution and the temperature at which a solution of that same composition is in equilibrium with solid imide crystals. Supercooling is a measure of the crystallization potential. As a practical matter, sufficient refrigerant should be vaporized to impart at least about a 0.05° F. supercooling of the remaining solution. Where the supercooling is excessive, for example, at about 5° F., and higher, the resulting crystal sizing is in general no better than that obtained in conventional batch crystallizations. Determination of the amount of supercooling is readily established by reference to solubility curves and a knowledge of the system composition. Where it is excessive, a reduction in the rate of refrigerant introduction will suffice to bring it down to a satisfactory level.

In the case of the use of carbon dioxide as the refrigerant, the addition of from about 0.1 to 1.0 part thereof for each part of fresh feed added to the slurry will in general produce a satisfactory degree of supercooling. For other refrigerants the useful range varies depending mainly upon the relative latent heats of vaporization. For example, in using a refrigerant having a latent heat value twice that of carbon dioxide, just one-half as much weight is required, i.e., a corresponding range of 0.05 to 0.5 part etc.

Depending upon the particular refrigerant employed, the addition may be made in admixture with the fresh feed or separately. Preferably the introduction is made separately and after the introduction of the fresh feed, i.e., at a subsequent point in the circulation loop.

The following are specific examples of compounds which are suitable feeds for the instant process:

N-(1,1,2,2-tetrachloroethylthio)-phthalimide
N-(1,1,2,2-tetrachloro-3,3,3-trifluoropropylthio)-phthalimide
N-(perfluoromethylthio)-phthalimide
N-(1,1,2,2-tetrachloroethylthio)-cis-Δ⁴-cyclohexene-1,2-dicarboximide
N-(1,1,2,2-tetrachloroethylthio)-cyclobutane-1,2-dicarboximide
N-(1,1,2,2-tetrachloroethylthio)-cyclopentane-1,2-dicarboximide
N-(perchloropropylthio)-4,5-dimethylphthalimide
N-(s-butylthio)-Δ¹-cyclohexene-1,2-dicarboximide
N-(1,2,2-trichloroethylthio)-phthalimide
N-(2-chloro-1,2-dibromoethylthio)-cyclopentane-1,2-dicarboximide
N-(1,1,2,2-tetrochloroethylthio)-cyclohexane-1,2-dicarboximide
N-(1,2,2-trichloroethylthio)-4-ethylcyclohexane-1,2-dicarboximide
N-(1,2,2-tetrachloroethylthio)-Δ¹,²-cyclohexadiene-1,4-dicarboximide
N-(1,1,2,2-tetrachloroethylthio)Δ²-cyclopentene-1,2-dicarboximide
N-(t-butylthio)-phthalimide
N-(perbromomomethylthio)-4,5-diethylcyclohexane-1,2-dicarboximide and the like imides. The preferred process feeds are the $C_6$-carbocyclic imides.

Organic solvents in general are useful media for the subject process. In general these have little or no chemical interaction between the solvent and imide being purified and are satisfactory. Aromatic hydrocarbon solvents are preferred for reasons of cost, of favorable solubilities, vapor pressures and the like. These include benzene, toluene, the xylenes, mesitylene, cumene, cymene, t-butylbenzene, ethylbenzene, mixtures thereof, as well as commercial aromatic refinery solvent cuts in general, e.g., lower aromatic hydrocarbon solvents.

Useful operational temperatures will vary depending upon the particular imide being purified and the solvent medium. Normally this temperature will be one where loss of the desired imide to motor liquor is reasonably low, i.e., where imide solubility is of the order of 0.1 to 1 weight percent. In some cases, depending upon the particular impurity, a higher temperature is desirably used. In any event useful process temperatures will ordinarily be below the imide decomposition temperature, for feed solutions or slurry, and for the latter will be in general in the range below about 125° F. and above about 1% solubility value.

What is claimed is:
1. Continuous process for the crystallization of an imide of the formula

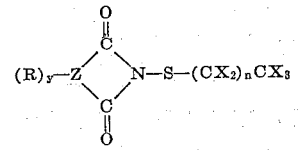

wherein Z is a ring selected from the group consisting of $C_{4-6}$, inclusive, carbocycles, n is in the range of 0 to 3, inclusive; y is in the range of 0 to 2, inclusive; R is a lower alkyl group and said X's are the same or different and selected from the group consisting of hydrogen and halogen having an atomic number less than 54; and wherein said carboxyl functions are in the 1,2-orientation relative to said ring, which comprises circulating a slurry in an elongated cyclical flow path, said slurry comprising a mixture of said imide as a solid dispersed in an inert organic solvent; introducing into said circulating slurry a solution of said imide in said solvent; introducing into said circulating slurry a refrigerant selected from the group consisting of inert fluid refrigerants; substantially removing said refrigerant by vaporization from said circulating slurry; withdrawing from said circulating slurry an amount of slurry sufficient to maintain a substantial input-output balance for said circulating slurry; wherein said introduction of the solution to the circulating slurry is to the lower portion thereof; wherein the vaporization of the refrigerant from the circulating slurry is from the upper portion thereof; wherein said withdrawal is at a point in the cyclical flow path which is subsequent to said vaporization; and wherein the temperature of said slurry is maintained in the range below the incipient crystal forming temperature of said solution and above about the 0.1 weight percent solubility temperature of said imide, said temperature being maintained by addition of an amount of said refrigerant in the range from about 0.05 to 1 part for each part of the added solution and sufficient to supercool said slurry an amount in the range from about 0.1 to 5° F.

2. The process as in claim 1 wherein said refrigerant is carbon dioxide, said supercooling is less than about 2° F. and said temperature is maintained by the addition for each part of the added solution of from about 0.1 to 1.0 part of carbon dioxide.

3. The process as in claim 1 wherein said added solution is about a saturated solution of said imide dissolved in a lower aromatic hydrocarbon solvent.

4. Continuous process for the crystallization of an imide of the formula

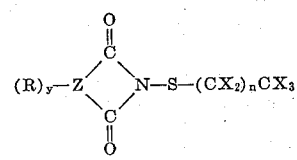

wherein Z is a ring selected from the group consisting of $C_{4-6}$, inclusive, carbocycles, n is in the range 0 to 3, inclusive; y is in the range 0 to 2, inclusive; R is a lower alkyl group and said X's are the same or different and selected from the group consisting of hydrogen and halogen having an atomic number less than 54; and wherein said carboxyl functions are in the 1,2-orientation relative to said ring, which comprises circulating a slurry in a crystallizer adapted to provide an elongated cyclical flow path, said slurry comprising a mixture of said imide as a solid dispersed in an inert organic solvent; introducing into said circulating slurry a solution of said imide in said solvent; introducing into said circulating slurry a refrigerant selected from the group consisting of inert fluid refrigerants; substantially removing said refrigerant by vaporization from said circulating slurry; withdrawing from said circulating slurry an amount of slurry sufficient to maintain a substantial input-output balance for said circulating slurry; wherein said introduction of the solution to the circulating slurry is to the lower portion thereof; wherein the vaporization of the refrigerant from the circulating slurry is from the upper portion thereof; wherein said withdrawal is at a point in the cyclical flow path which is subsequent to said vaporization; and wherein the temperature of said slurry is maintained in the range below the incipient crystal forming temperature of said solution and above about the 0.1 weight percent solubility temperature of said imide, said temperature being maintained by addition of an amount of said refrigerant in the range from about 0.05 to 1 part for each part of the added solution and sufficient to super-cool said slurry an amount in the range from about 0.1 to 5° F.

5. The process as in claim 4 wherein said refrigerant is carbon dioxide, said supercooling is less than about 2° F. and said temperature is maintained by the addition for each part of the added solution of from about 0.1 to 1.0 part of carbon dioxide.

6. The process as in claim 4 wherein said added solution is substantially a saturated solution of said imide dissolved in a lower aromatic hydrocarbon solvent.

7. Continuous process for the crystallization of N-(1,1,2,2-tetrachloroethylthio)-Δ-4-tetrahydrophthalimide, which comprises circulating a slurry in an elongated cyclical flow path, said slurry comprising a mixture of said imide as a solid dispersed in an intert organic solvent; introducing into said circulating slurry a solution of said imide in said solvent; introducing into said circulating slurry a refrigerant selected from the group consisting of inert fluid refrigerants; substantially removing said refrigerant by vaporization from said circulating slurry; withdrawing from said circulating slurry an amount of slurry sufficient to maintain a substantial input-output balance for said circulating slurry; wherein said introduction of the solution to the circulating slurry is to the lower portion thereof; wherein the vaporization of the refrigerant from the circulating slurry is from the upper potion thereof; wherein said withdrawal of slurry is at a point in the cyclical flow path which is subsequent to said vaporization; and wherein the temperature of said slurry is maintained in the range below the incipient crystal forming temperature of said solution and above about the 0.1 weight percent solubility temperature of said imide, said temperature being maintained by addition of an amount of said refrigerant in the range from about 0.05 to 1 part for each part of the added solution and sufficient to supercool said slurry an amount in the range from about 0.1 to 5° F.

8. The process as in claim 7 wherein said refrigerant is carbon dioxide, said supercooling is less than about 2° F. and said temperature is maintained by the addition for each part of the added solution of from about 0.1 to 1.0 part of carbon dioxide.

9. The process as in claim 7 wherein said added solution is substantially a saturated solution of said imide dissolved in a lower aromatic hydrocabon solvent.

References Cited
UNITED STATES PATENTS 3,314,969  4/1967  Flay _____ 260—326

ALEX MAZEL, Primary Examiner

J. A. NARCAVAGE, Assistant Examiner

U.S. Cl. X.R.

62—58; 260—326.5, 707